Figure 1:
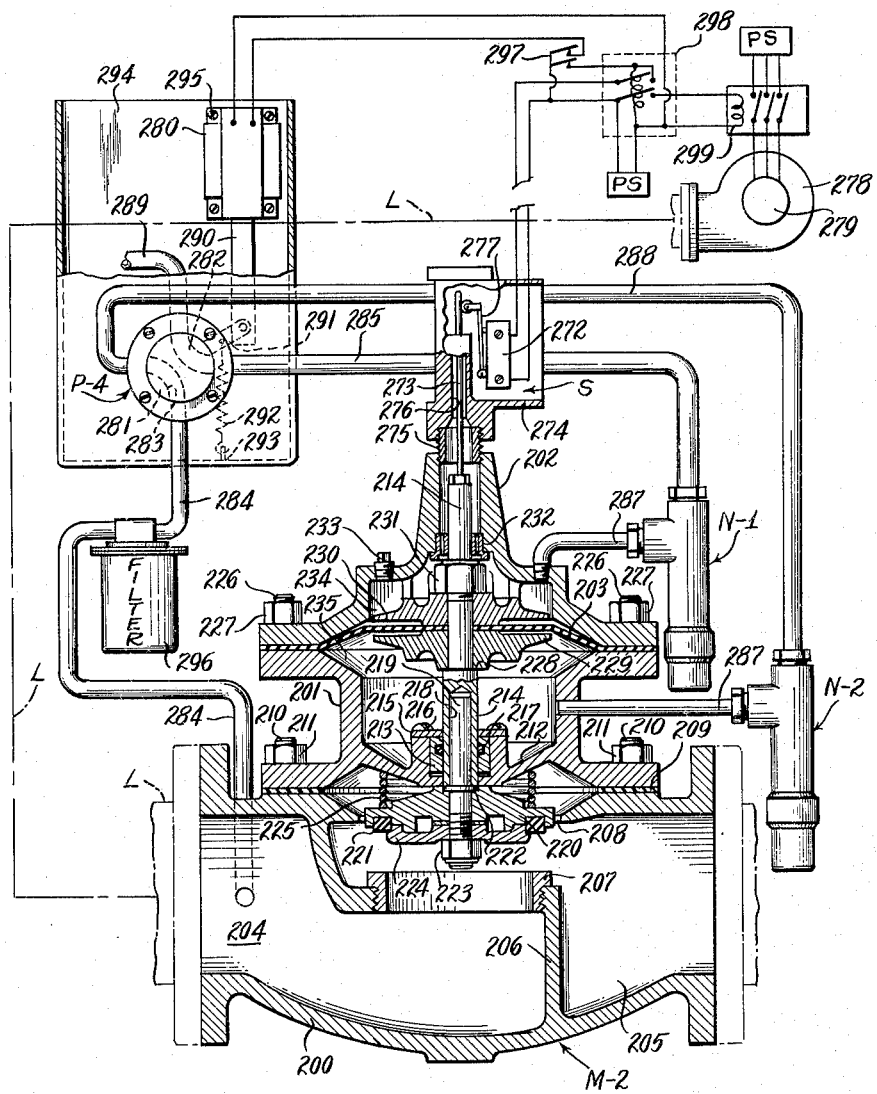

INVENTOR.
David E. Griswold
BY
ATTORNEYS

Nov. 16, 1965 D. E. GRISWOLD 3,217,653
VALVES AND AUTOMATIC CONTROLS
Original Filed Sept. 30, 1954 3 Sheets-Sheet 2

INVENTOR.
David E. Griswold
BY
Bacon & Thomas
ATTORNEYS

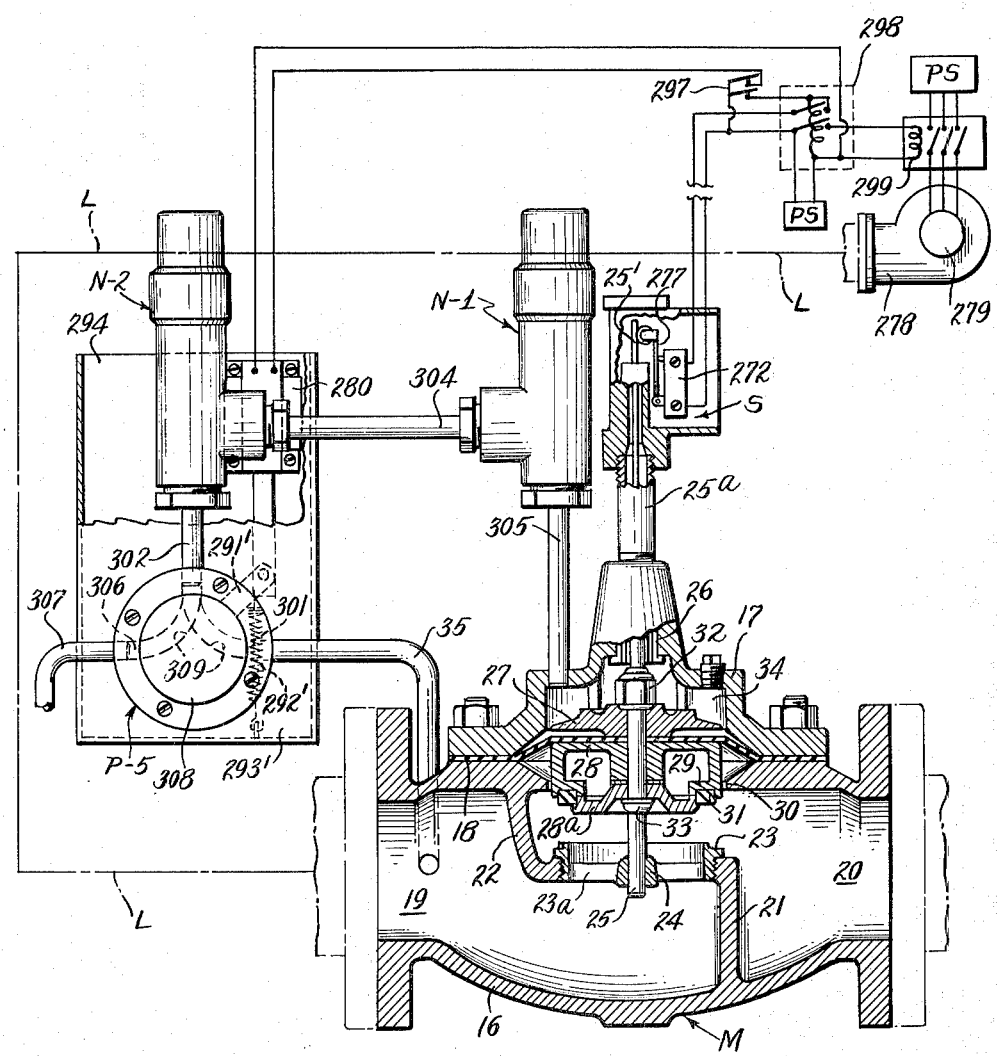

United States Patent Office 3,217,653
Patented Nov. 16, 1965

3,217,653
VALVES AND AUTOMATIC CONTROLS
David E. Griswold, Costa Mesa, Calif., assignor to Donald
G. Griswold, Newport Beach, Calif.
Original application Sept. 30, 1954, Ser. No. 459,456, now
Patent No. 2,991,796, dated July 11, 1961. Divided
and this application Mar. 9, 1961, Ser. No. 94,482
8 Claims. (Cl. 103—40)

This application is a division of application Serial Number 459,496, filed on September 30, 1954, now Patent No. 2,991,796.

This invention relates to valves and, more particularly, to main valves having various combinations of automatically operable control elements associated therewith to effect pressure regulation, pressure relief, etc., while at the same time controlling the opening and/or closing speed of said main valves.

The invention broadly contemplates automatic valves with which means are included for controlling the speed of the valve opening and closing operations, whereby these operations may be performed at the same or at different selected speeds. In one embodiment thereof, the invention is especially advantageous in providing automatic valves for installations in which it is desirable to quickly accomplish one valve operation and to more slowly accomplish the reverse operation. For example, in some valve installations it is necessary to provide a valve that has a fast closing action and a slow opening action. Prior to the present invention, valves constructed for fast closing usually also provided for fast opening. However, where the system does not require fast opening it is more desirable that the valve open at a slower rate to avoid pulsations of delivery pressure. In systems requiring maintenance of a critical pressure condition on the outlet or downstream side of the valve, a fast opening valve presents a major problem due to the pulsation or cycling of the valve and consequent fluttering or pulsation of the delivery pressure.

It is desirable in some systems to provide a valve that has a fast closing rate and a relatively restricted opening rate. For example, in a system employing an automatic pressure reducing valve, the valve should preferably close rapidly to correct any excess pressure condition on its downstream side and reopen slowly at a controlled rate to avoid creating such condition.

It is desirable in other systems to provide a valve that has a fast opening operation and a relatively restricted closing rate. This is true, for example, in systems employing automatic pressure relief valves wherein it is desirable to provide a valve which will open quickly to take care of excessive pressure, or sudden surges in the pipe line, and which will close at a relatively slower, controlled rate to prevent line shock, chatter, and slamming of the valve disk against the seat.

Another application of the invention resides in the provision of a control valve wherein both opening and closing operations are accomplished at a relatively slow adjustable rate. Such a valve is particularly advantageous for use with centrifugal pumps wherein it is desirable to start the pump against a closed valve, and then to slowly open such valve, and to slowly reduce the velocity in the discharge line by gradually closing the valve before the pump is stopped.

The present valves and control combination provide relatively simple apparatus for accomplishing the types of control referred to above. In addition, the control elements provide for great sensitivity of operation of the main valves associated therewith and are readily adaptable for accomplishing a wide variety of valve control operations.

Accordingly, the principal object of this invention is to provide automatic valves having means connected therewith to selectively control the rate of opening and of closing, whereby the opening and closing operations may be accomplished at the same or at different selected speeds.

Another object is to provide automatic main valve and control combinations in which the control elements thereof may be readily arranged to provide different modes of operation of the main valve and also provide great flexibility in the control of the valve opening and closing rates.

Another object is to provide automatic valves of the type described wherein the function of controlling the opening and closing rates is accomplished by the provision of means of more simple construction and improved sensitivity than previously obtainable.

Another object is to provide automatic valves of the type described wherein the function of controlling the opening and closing rates is accomplished by the provision of means of more simple construction and improved sensitivity than previously obtainable.

Another object is to provide automatic valves having means to provide independently adjustable opening and closing rates.

Another object is to provide an automatic valve in combination with a pump control system, whereby the valve may be automatically slowly opened after starting the pump and may be automatically slowly closed before stopping the pump.

These and other objects and advantages hereinafter apparent from the ensuing description are accomplished in accordance with the present invention by the utilization of novel combinations of a fluid pressure operable main valve, an associated pilot valve or other control apparatus for controlling the supply of operating fluid to and the exhaust of operating fluid from the pressure chamber of the main valve, and one or more adjustable, combined needle and check valves for regulating the rate of flow of said operating fluid to and from said pressure chamber.

The arrangement of the combined needle and check valve in the combination determines whether the main valve is fast opening and slow closing in response to the associated pilot valve, or other control member, or whether the reverse mode of operation takes place. In certain embodiments of the invention more than one combined needle and check valve may be employed in the assembly in order to selectively and adjustably control both opening and closing operations of the main valve.

Figure 2:
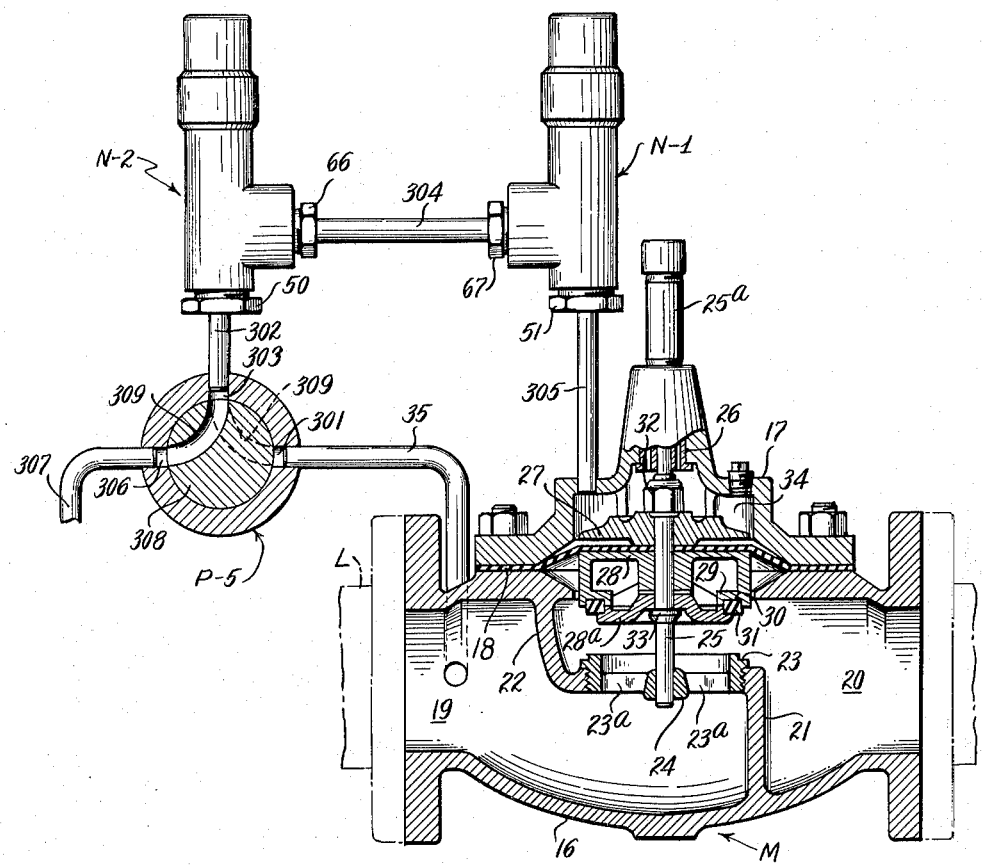

FIG. 1 diagrammatically illustrates a power-operated pump control valve and a solenoid-operated pilot valve and an electrical circuit therefor, with which a pair of combined needle and check valves have been assembled in such manner that the rates of opening and closing of the pump control valve can be selectively adjusted;

FIG. 2 diagrammatically illustrates an arrangement of main valve, two combined needle and check valves connected in series, and control means therefor arranged so that the opening and closing speeds of the main valve can be separately adjusted; and FIG. 3 diagrammatically illustrates the main valve, the two series connected, combined needle and check valves, and the control means of FIG. 2, combined with the electrical circuit and pump of FIG. 1.

FIG. 1 shows an embodiment of the invention wherein independently controlled opening and closing speed adjustments provided by a pair of combined needle and check valves N-1 and N-2 are utilized to good advantage. In this embodiment a power-operated valve M-2 is illustrated.

The valve M–2 is provided with a micro-switch assembly generally designated as S, which includes a switch element 272 adapted to be operated by an extension 273 of the valve stem 214. The switch S includes a housing 274 mounted on the valve cover by a pipe nipple 275. The valve stem extension 273 operates in an opening 276 in the housing member 274 and is adapted to urge switch blade 277 to a closed position when the valve M–2 is open and to permit switch blade 277 to open when the valve M–2 is in a closed position.

The main valve M–2 comprises a body 200, an intermediate spool-shaped section 201, a cover member 202 and a diaphragm 203 disposed between the intermediate section and cover member. The body 200 is provided with an inlet chamber 204 and an outlet chamber 205 separated by a partition 206, which provides an opening to receive a valve seat 207. The body 200 has a central opening 208 axially aligned with the seat 207. The spool-shaped intermediate section 201 is disposed above the valve body 200 and an annular gasket 209 is interposed between the intermediate section and the valve body. Studs 210 provided with nuts 211 hold these parts in assembled relation.

The intermediate section 201 has a transverse conical wall 212 provided with a central opening containing a bushing 213 in which a valve stem 214 is slidably mounted. A plate 215, held to the wall 212 by screws 216 and provided with a central opening to accommodate the valve stem 214, retains the bushing 213 in proper position. An O-ring 217 is provided in a groove in bushing 213 to prevent leakage of fluid along the valve stem 214. The lower portion of the valve stem 214 has a bore 218 which slidably receives a member 219 attached to a valve disc or plate 220 carrying a sealing ring 221. The valve plate 220 bears against a flange 222 on the member 219 and is held thereagainst by a lock nut 223, which threadedly engages the lower end of member 219. A retainer ring 224 holds the ring 221 in position on the valve plate 220. A spring 225 is positioned between the top of valve plate 220 and the bottom of the transverse wall 212 in the intermediate section 201 to urge the valve closure assembly downwardly toward its closed position in the event of pressure failure and irrespective of the position of valve stem 214.

The cover member 202 and diaphragm 203 are held in assembled relation with the intermediate section 201 by studs 226 and nuts 227. The valve stem 214 is provided with a shoulder 228, which forms an abutment for a diaphragm supporting washer 229 at the lower side of the diaphragm 203. A similar washer 230 is mounted upon the stem above the diaphragm 203 and is held in place by a lock nut 231. A bushing 232 is provided in the cover member 202 for maintaining the valve stem 214 in axial alignment. A bleed plug 233 is provided for venting the pressure chamber 234 above the diaphragm 203.

The valve M–2 is operated by the differential in the fluid pressure in chamber 234 above the diaphragm 203, and the fluid pressure in chamber 235 below said diaphragm.

The valve M–2, as shown in FIG. 1, is used as an automatic control valve for a centrifugal pump 278 and may be located in the pump's main discharge line L near the pump. The pump 278 is driven by a three-phase motor 279. The opening and closing operations of the valve M–2 are controlled by a pilot valve P–4 which is automatically controlled by a solenoid 280 connected in the pump control circuit.

The pilot valve P–4 is schematically illustrated as a four-way valve having a core 281 provided with a pair of arcuate ports 282 and 283. The port 283 is adapted to connect, in one position of the core 281, a conduit 284 from the inlet chamber 204 of the valve M–2 to a conduit 288 which communicates through a combined needle and check valve N–2 with the lower pressure chamber 235 of the valve M–2. The port 282 then connects the upper pressure chamber 234 of the valve M–2 through conduit 287, needle valve N–1 and conduit 285 to a drain 289. When the core 281 is turned 90° clockwise from the position shown in FIG. 1, the port 283 then operates to connect lower pressure chamber 235 with the drain 289 while at the same time upper pressure chamber 234 is connected through port 282 with the inlet chamber 204 of the valve M–2.

The details of the combined needle and check valves N–1 and N–2 are fully disclosed in Patent No. 2,925,243, issued February 16, 1960, and are of a type providing for an unrestricted flow of fluid in one direction, and a predetermined, regulatable, restricted flow in the other direction.

The core 281 of the pilot valve P–4 is operated by the armature 290 of the solenoid 280, which is connected thereto by a lever 291. A spring 292 connected to the lever 291 and to the bottom of a housing 293 urges the lever 291 in the opposite direction from the action of the armature 290 when the solenoid is energized. The solenoid 280 and the pilot valve P–4 are mounted firmly on a wall 294 of the housing 293 by screws 295, and the entire assembly can be enclosed by a removable steel cover, not shown.

A filter 296 is connected in conduit 284 to prevent foreign matter in the fluid from chamber 204 from interfering with the operation of the control valve parts.

The pump control valve M–2 is particularly effective in eliminating water hammer and surge pressure in the discharge line L caused by the stopping of the centrifugal pump 278. The valve M–2 is normally in closed position when the pump 278 is started since a centrifugal pump requires the smallest amount of power when operating against a closed valve. The motor 279 thus starts under minimum load. The valve M–2 is designed to slowly open as soon as the pump 278 reaches its normal speed, the time of opening being controlled by the setting of the needle valve N–1, which regulates the rate of flow of fluid from the upper pressure chamber 234 to the drain 289. When it is desired to stop the pump, the valve M–2 is first closed slowly, the rate of closing being controlled by the setting of the needle valve N–2, which regulates the flow of fluid from lower pressure chamber 235 to the drain 289. Accordingly, the velocity in the discharge main is gradually reduced. After the valve M–2 is entirely closed, the electrical circuit is designed to stop the pump automatically.

The operation including the electrical control circuit will now be more specifically described. The electrical circuit includes a manual or automatic switch 297, a two-pole normally open relay 298, a motor starting relay 299 in addition to the micro-switch 272 operated by the valve stem extension 273, and the solenoid 280 for operating the pilot valve P–4. To start the pump 278 and open the valve M–2, the switch 297 is closed, which effects the closing of the relay 298 which, in turn, completes the circuit to the motor starting relay 299 and starts the pump motor 279. The closing of switch 297 also completes the circuit to the solenoid 280, energizing the same and causing the core 281 of the pilot valve P–4 to be rotated to the position shown wherein the fluid pressure in valve inlet chamber 204 is connected through valve N–2 to the lower chamber 235 while at the same time the upper chamber 234 is connected through valve N–1 to drain 289. Accordingly, the valve M–2 will slowly open at a preselected rate determined by the setting of the needle valve stem in the valve N–1, whereupon the main valve stem extension 273 contacts the arm 277 of the micro-switch 272, thereby completing a holding circuit including the motor starting relay 299.

In order to close the valve M–2 and stop the pump motor 279, the switch 297 is opened, which de-energizes the solenoid 280, causing the plunger 290 to move downwardly under the action of the spring 292, thereby rotating the valve core 281, whereupon fluid pressure from the inlet chamber 204 is directed to the upper pressure chamber 234 through the valve N–1, and the lower pressure chamber 235 is connected through the valve N–2 to the drain 289. The main valve M–2 thereupon closes gradually at a preselected rate determined by the setting of the valve N–2, while the pump 278 is still running. As the valve M–2 closes, the valve stem extension 273 will be lowered, finally permitting opening of the microswitch 272, which thereupon causes relay 298 to open, breaking the circuit to the motor relay 299 so that the motor 279 stops and the pump 278 discontinues operation.

It will be noted that the system is such that in starting, the pump 278 begins to operate against a closed valve M–2, which is gradually opened with the pump running, and that when the pump is to be stopped the valve M–2 first gradually closes while the pump is still running and the final closing of said valve stops said pump. The needle valves N–1 and N–2 in this combination provide a simple and effective means for independently controlling adjustable slow opening and slow closing operations of the valve M–2. These valves, of course, can be readjusted to effect rapid opening and slow closing, and vice versa, if desired.

FIG. 2 illustrates a modification wherein a pair of combined needle and check valves N–1 and N–2 are arranged to independently control the opening and closing rates of a main valve M connected in a pipe line L', said main valve comprising a body 16, a cover member 17 and a flexible diaphragm 18 disposed intermediate said body and cover. The body 16 is provided with an inlet chamber 19 and an outlet chamber 20 separated by a partition including an upright wall 21 and a downwardly extending wall 22, which provide an opening to receive a valve seat 23. Seat 23 is provided with a plurality of radial arms 23a, which merge centrally and provide a guide 24 for the lower end of a valve stem 25. The upper end of the valve stem 25 is guided in a bushing 26 mounted in the cover 17. Valve stem 25 extends through a central opening in the diaphragm 18 and carries a disk-like diaphragm supporting plate 27, which engages a portion of the upper surface of the diaphragm 18 and also carries a lower diaphragm supporting member 28 which engages a portion of the lower side of said diaphragm. The member 28 has an inwardly projecting flange 29 at its lower side provided with an annular recess 30 in which an annular sealing ring 31 is seated. The sealing ring 31 is adapted to engage the upper surface of the seat 23 when the valve is closed to prevent all flow between the inlet chamber 19 and outlet chamber 20. A supporting disk 28a holds the sealing ring 31 in position and also supports the lower diaphragm supporting member 28. A lock nut 32 in cooperation with an enlarged portion 33 on the valve stem 25 secures the upper plate 27, diaphragm 18, lower diaphragm supporting member 28 and supporting disk 28a in assembled relation. The cover member 17 is constructed to provide a chamber 34 above the diaphragm 18 to receive fluid under pressure for effecting downward flexing of the diaphragm to cause the sealing ring 31 to engage with the seat 23 and thus close the valve M. The valve stem 25 is spring-loaded in a conventional manner by a spring (not shown) contained in pipe nipple 25a.

A conduit 35 has one end thereof connected with the inlet chamber 19 of the valve M and its other end is connected with a port 301 of a pilot valve P–5. One end of a conduit 302 is connected with another port 303 of the valve P–5, and its opposite end is connected to the valve N–2 by a fitting 50. The lateral opening of the valve N–2 is connected by a fitting 66 to one end of a conduit 304, the opposite end of which is connected by a fitting 67 with the lateral opening of the valve N–1. A fitting 51 connects the end opening of the valve N–1 to one end of a conduit 305, the oposite end of which is connected with the valve cover 17 and communicates with the diaphragm chamber 34 of the valve M.

The pilot valve P–5 has a port 306 which communicates with one end of a drain conduit 307 and includes a rotatable core 308 having a single arcuate port 309 shown in full lines interconnecting the ports 303 and 306, and corresponding to the open position of the main valve M. It will be noted that when the port 309 is in the position shown in full lines, the chamber 34 is open to exhaust through conduit 305, valve N–1, conduit 304, valve N–2, conduit 302, port 309, and drain conduit 307. It will also be understood that the rate at which operating fluid can be forced out of the chamber 34 by line pressure acting upon the valve disc assembly 28, etc., will depend upon the adjustment of the needle valve stem of the valve N–2, whereby the opening rate of the valve M can be controlled.

When the port 309 of the pilot valve P–5 is moved to the position shown in dotted lines, operating fluid from inlet chamber 19 can flow to the diaphragm chamber 34 of the main valve M through conduit 35, port 309, conduit 302, valve N–2, conduit 304, valve N–1, and conduit 305. The rate of flow of operating fluid into the chamber 34 is controlled by the adjustment of the needle valve stem of the valve N–1. Hence, the closing rate of the valve M is controlled by the valve N–1.

It will be apparent from the interconnection of the valves N–1 and N–2 in series, as shown in FIG. 2, that the valve M can be controlled to open at any desired rate by the valve N–2, and to close at any desired rate by the valve N–1.

It will be understood that the valve M could be used in the pump system of FIG. 1 in place of the valve M–2, whereupon the pilot valve P–5 would be operated by the solenoid 280, and the valve would include the microswitch S of FIG. 1. Such an arrangement is illustrated in FIG. 3. It will also be understood that the pilot valve P–5 may be manually or automatically operated, as desired.

Referring to FIG. 3, wherein components identical to those illustrated in FIGS. 1 and 2 are identified by the same reference numerals as in said FIGS. 1 and 2, the valve M is shown connected in the main discharge line L of the centrifugal pump 278. The micro-switch assembly S is shown to be mounted on the upper end of the nipple 25a, the valve stem 25 being provided with an extension 25', corresponding to the extension 273 in FIG. 1, which operates the switch blade 277 to close the switch 272 when the valve M is open.

The pilot valve P–5, in FIG. 3, is mounted on a housing 293', which corresponds to the housing 293 of FIG. 1. The valve P–5 is operated by the solenoid 280, which is connected to the valve by a lever 291' corresponding to the lever 291. A spring 292', corresponding to the spring 292, urges the lever 291' downwardly when the solenoid 280 is de-energized.

The pump system of FIG. 3, incorporating the valve M, operates in a manner analogous to that of the pump system of FIG. 1. The valve M is normally in a closed position when the pump 278 is started, and is designed to slowly open at a rate determined by the setting of valve N–2. When it is desired to stop the pump 278, the valve M is first closed slowly at a rate controlled by the setting of the needle valve N–1, which regulates the flow of fluid into the diaphragm chamber 34. After the valve M is entirely closed, the electrical circuit is designed to stop the pump 278 automatically.

More specifically, the pump system of FIG. 3 operates as follows. To start the pump 278 and open the initially closed valve M, the switch 297 is first closed, which effects the closing of the relay 298 to complete the circuit to the motor starting relay 299 and starts the motor 279. The closing of switch 297 also energizes the solenoid 280, causing the core 308 of the pilot valve P–5 to be rotated to a position wherein the port 309 connects the conduit 302 to the drain conduit 307. The chamber 34 is thus opened to exhaust, and fluid is exhausted therefrom at a rate controlled by the setting of needle valve N–2 as line pressure acts upon the valve disc assembly 28, etc., to urge the valve M open. When the valve stem 25 moves upwardly upon opening the valve M, the extension 25' thereon engages arm 277 and closes the micro-switch 272, thereby completing a holding circuit including the motor starting relay 299.

When it is desired to close the valve M and stop the pump motor 279, the switch 297 is first opened to de-energize the solenoid 280. Thereupon, the spring 292' rotates the valve core 308 to connect port 309 between the conduits 35 and 302, thus providing operating fluid to the chamber 34 through the series-connected valves N–2 and N–1. The valve M is then moved toward its closed position, at a rate determined by the setting of needle valve N–1. As the valve M moves to its closed position, the valve stem 25 is lowered until the extension 25' thereon disengages sufficiently from the arm 277 to cause opening of the micro-switch 272. Opening of the micro-switch 272 breaks the circuit to the motor relay 299, so that the motor 279 stops and the pump 278 discontinues operation. This completes an operating cycle.

It will be understood that various changes may be made in the details of construction and in the arrangement of the parts of the main valves, control valves, combined needle and check valves, and auxiliary apparatus disclosed herein, without departure from the principles of the invention or from the scope of the annexed claims.

I claim:
1. A pump system, comprising: a centrifugal pump; an electric motor connected with said pump; an electrical control circuit including a solenoid and a switch for connecting said motor and solenoid with a source of electrical energy; a discharge line connected with said pump; a pump control valve in said discharge line, said valve having pressure chamber means and a closure means, said closure means being responsive to the pressure in said pressure chamber means for effecting the opening and closing of said valve, said pressure chamber means having conduit means communicating therewith for the supply and exhaust of operating fluid; control means, connected with said solenoid, selectively and alternately connecting said conduit means with a source of fluid under pressure to receive operating fluid, or to drain; and combined needle and check valve means in said conduit means arranged to provide for the passage of operating fluid to said pressure chamber means at one preselected flow rate and to provide for the passage of operating fluid from said pressure chamber means at another preselected flow rate, said electrical control circuit further including a holding circuit operable in response to the position of the closure means of said pump control valve to maintain a closed electrical circuit to the pump motor until said pump control valve is substantially fully closed, whereby said pump control valve is automatically opened at a predetermined rate after said switch is closed and the pump motor starts, and is automatically closed at a predetermined rate after said switch is opened.

2. A pump system as defined in claim 1, in which the holding circuit, which is operable in response to the position of the closure means of said pump control valve, comprises a switch operable by a movable member attached to the closure means of said pump control valve.

3. A pump system, comprising: a centrifugal pump; an electric motor connected wtih said pump; an electrical control circuit including a solenoid and a switch for connecting said motor and solenoid with a source of electrical energy; a discharge line connected with said pump; a pump control valve in said discharge line, said valve having a pressure chamber and a closure means, responsive to the pressure in said pressure chamber, for effecting the opening and closing of said valve, said pressure chamber having a conduit communicating therewith for the supply and exhaust of operating fluid; control means, connected with said solenoid, selectively and alternately connecting said conduit with a source of fluid under pressure to receive operating fluid, or to drain; and a pair of combined needle and check valves in series in said conduit, one of said combined needle and check valves being arranged to provide for an unrestricted rate of flow of operating fluid to said pressure chamber and a predetermined, adjustable, restricted flow of operating fluid from said pressure chamber, and the other of said combined needle and check valves being arranged to provide for an unrestricted rate of flow of operating fluid from said pressure chamber and a predetermined, adjustable, restricted flow of operating fluid to said pressure chamber, said electrical control circuit further including a holding circuit operable in response to the position of the closure means of said pump control valve to maintain a closed electrical circuit to the pump motor until said pump control valve is substantially completely closed, whereby said pump control valve is automatically slowly opened after said switch is closed and the pump motor starts and is automatically slowly closed after said switch is opened.

4. A pump system, comprising: a centrifugal pump; an electric motor connected with said pump; an electrical control circuit including a solenoid and a switch for connecting said solenoid wtih a source of electrical energy; a discharge line connected with said pump; a pump control valve in said discharge line, said valve having at least one pressure chamber and a closure means, responsive to the pressure in said pressure chamber, for effecting the opening and closing of said valve, said pressure chamber having a conduit communicating therewith for the supply and exhaust of operating fluid; control means, connected with said solenoid, selectively and alternately connecting said conduit wtih a source of fluid under pressure to receive operating fluid, or to drain; and a pair of combined needle and check valves in said conduit, one of said combined needle and check valves including means providing for the passage of operating fluid to said pressure chamber at a preselected restricted flow rate and providing for unrestricted flow from the pressure chamber, and the other combined needle and check valve including means providing for the passage of operating fluid from said pressure chamber at a preselected restricted flow rate and providing for unrestricted flow to the pressure chamber, said electrical control circuit further including a holding circuit operable in response to the position of the closure means to said pump control valve to maintain a closed electrical circuit to the pump motor until said pump control valve is substantially fully closed, whereby said pump control valve is automatically opened at a predetermined rate after said switch is closed and the pump motor starts, and is automatically closed at a predetermined rate after said switch is opened.

5. A pump system, comprising: a centrifugal pump; an electric motor connected wtih said pump; an electrical control circuit including a solenoid and a switch connecting said motor and solenoid with a source of electrical energy; a discharge line connected with said pump; a pump control valve in said discharge line, said valve having a pair of pressure chambers and a closure means, responsive to the pressure difference in said pressure chambers, for effecting the opening and closing of said valve, each pressure chamber having a conduit connected therewith for the supply and exhaust of operating fluid; control means, connected with said solenoid, selectively and alternately connecting one of said conduits with a source of fluid under pressure to receive operating fluid and connecting the other of said conduits to drain; a combined needle and check valve in each conduit, each of said combined needle and check valves including means providing for the passage of operating fluid to its respective pressure chamber at a preselected restricted flow rate and providing for unrestricted flow therefrom, said electrical control circuit further including a holding circuit operable in response to the position of the closure means of said pump control valve to maintain a closed electrical circuit to the pump motor until said pump control valve is substantially fully closed, whereby said pump control valve is automatically opened at a predetermined rate after said switch is closed and the pump motor starts, and is automatically closed at a predetermined rate after said switch is opened.

6. Means for controlling fluid flow through a pipe line, comprising: a main valve adapted to be connected in said pipe line and having a body provided with inlet and outlet chambers, and means carried by said main valve including pressure chamber means and a closure means, responsive to the pressure in said pressure chamber means, for effecting the opening and closing of said valve, said pressure chamber means including a diaphragm movable by fluid pressure and which is connected directly to said closure means, said pressure chamber means having conduit means communicating therewith for the supply and exhaust of operating fluid; a pilot valve selectively and alternately connecting said conduit means with a source of operating fluid under pressure to deliver operating fluid to said pressure chamber means or to drain fluid therefrom; and combined adjustable needle and check valve means in said conduit means arranged to provide for the passage of operating fluid to said pressure chamber means at one preselected flow rate and to provide for the passage of operating fluid from said pressure chamber means at another preselected flow rate, whereby the main valve is caused to open and close at selectively controlled rates.

7. Means for controlling fluid flow through a pipe line, comprising: a main valve adapted to be connected in said pipe line and having a body provided with inlet and outlet chambers, and means including a pressure chamber and a closure means, responsive to the pressure in said pressure chamber, for effecting the opening and closing of said valve, said pressure chamber having a conduit communicating therewith for the supply and exhaust of operating fluid; a pilot valve selectively and alternately connecting said conduit with a source of operating fluid under pressure to deliver operating fluid to said pressure chamber or to drain fluid therefrom; and a pair of combined needle and check valves arranged in series in said conduit, one of said combined needle and check valves including means providing for the passage of operating fluid to said pressure chamber at one preselected flow rate and providing for unrestricted flow therefrom, and the other of said combined needle and check valves including means providing for the passage of operating fluid from said pressure chamber at another preselected flow rate and providing for unrestricted flow thereto, whereby the main valve is caused to open and close at selectively controlled rates.

8. Means for controlling fluid flow through a pipe line, comprising: a main valve adapted to be connected in said pipe line and having a body provided with inlet and outlet chambers, a pair of pressure chambers and a closure means, responsive to the pressure difference in said pressure chambers, for effecting the opening and closing of said valve, each pressure chamber having a conduit communicating therewith for the supply and exhaust of operating fluid; a pilot valve selectively and alternately connecting one of said conduits with a source of operating fluid under pressure to deliver operating fluid to the connecting pressure chamber and connecting the other of said conduits to drain the discharge operating fluid from the connecting pressure chamber; and a combined needle and check valve in each conduit, each of said combined needle and check valves including means providing for the passage of operating fluid to its connecting pressure chamber at a preselected flow rate and providing for unrestricted flow therefrom, whereby the main valve is caused to open and close at selectively controlled rates.

References Cited by the Examiner
UNITED STATES PATENTS

| | | | |
|---|---|---|---|
| 844,801 | 2/1907 | Hill | 230—31 |
| 865,388 | 9/1907 | Hill | 103—11 |
| 885,459 | 4/1908 | Engler | 251—25 |
| 1,798,973 | 3/1931 | Cordier | 251—30 |
| 2,196,279 | 4/1950 | Thomas | 137—489 |
| 2,219,359 | 10/1940 | Goit et al. | 103—25 |
| 2,220,327 | 11/1940 | Goit et al. | 103—25 |
| 2,421,325 | 5/1947 | Griswold | 137—489 |
| 2,543,846 | 3/1951 | Griswold | 137—489 |
| 2,631,606 | 3/1953 | Parks | 137—489 |
| 2,638,924 | 5/1953 | St. Clair | 137—641 |
| 2,765,743 | 10/1956 | Hollinshead | 103—25 |
| 2,767,277 | 10/1956 | Wirth | 103—25 |
| 2,771,905 | 11/1956 | Griswold | 137—489 |
| 2,942,619 | 6/1960 | Jackson | 137—501 |
| 2,991,796 | 7/1961 | Griswold | 137—489 |

LAURENCE V. EFNER, *Primary Examiner.*

JOSEPH H. BRANSON, JR., *Examiner.*